US006382101B1

(12) United States Patent
Richards

(10) Patent No.: US 6,382,101 B1
(45) Date of Patent: May 7, 2002

(54) REMOTE INK FOUNTAIN SELECTION METHOD AND APPARATUS

(75) Inventor: John Sheridan Richards, Barrington, NH (US)

(73) Assignee: Heidelberg Harris, Inc. & Heidelberger Druckmaschinen, Heidelberg (DE)

( * ) Notice: Subject to any disclaimer, the term of this patent is extended or adjusted under 35 U.S.C. 154(b) by 573 days.

(21) Appl. No.: 08/810,581

(22) Filed: Mar. 4, 1997

(51) Int. Cl.[7] .......................... B41F 31/02; G06K 9/56
(52) U.S. Cl. .......................... 101/365; 382/306
(58) Field of Search .......................... 1/365, DIG. 47, 1/DIG. 45, 366; 364/552; 382/306

(56) References Cited

U.S. PATENT DOCUMENTS

| | | | | |
|---|---|---|---|---|
| 3,958,509 A | * | 5/1976 | Muray et al. | 101/365 |
| 4,639,776 A | | 1/1987 | Foerster et al. | |
| 4,949,284 A | * | 8/1990 | Watanabe | 101/365 |
| 4,955,290 A | | 9/1990 | Kipphan et al. | |
| 5,163,012 A | * | 11/1992 | Wubrl et al. | 364/552 |

FOREIGN PATENT DOCUMENTS

| | | |
|---|---|---|
| DE | 33 25006 | 6/1984 |
| EP | 0 096 238 A2 | 12/1983 |
| EP | 0 096 238 B1 | 12/1983 |
| EP | 0 105 468 | 4/1984 |
| GB | 2248423 | 10/1992 |

* cited by examiner

*Primary Examiner*—Eugene Eickholt
(74) *Attorney, Agent, or Firm*—Kenyon & Kenyon

(57) ABSTRACT

An apparatus for remote ink control fountain selection comprising a video camera for reading a signature image, an image digitizer, an image comparator for comparing the signature image to a sample image set and a memory device for storing the sample image set in digitized form, as well as a method for remote ink fountain selection comprising the steps of digitizing sample images and providing each said sample image with an identification; digitizing a printed signature image from a printing press which corresponds to at least one of the sample images; comparing the digitized printed signature image to the digitized sample images; and outputting the identification of the digitized sample image upon a match with the digitized signature image.

6 Claims, 2 Drawing Sheets

REMOTE INK FOUNTAIN SELECTION METHOD AND APPARATUS

FIELD OF THE INVENTION

The invention relates generally to printing presses, and more particularly to the control of ink fountains for providing ink to a plate cylinder.

RELATED TECHNOLOGY

In typical color printing,. a color image to be reproduced by the printing press are separated into four component colors. Four printing plates are made from these separations. The printing plates then are placed on the plate cylinders of four separate printing units of the printing press, for providing black, cyan, magenta and yellow ink to the respective plates. As a web or sheet of paper runs through the press, the combination of the four inked images should accurately reproduce the image which is to be printed by the printing press.

Typical printing presses have a series of individual ink fountains which extend across the width of the print cylinder to deliver the proper amount of ink to the printing plate. Each fountain thus represent a "strip" of one of the colors along the width of the image or plate. A remote ink key adjustment is provided at a console, so that a press operator can adjust the corresponding individual ink fountains to deliver more or less ink to each strip of the plate.

Each printing plate may contain a plurality of images, for instance eight images, each image representing a page of a magazine. When a press prints on both sides of a web of paper, there then might be sixteen pages printed during a single run of the press. The printed web is then cut into sheets. The sheets are then folded into signatures so that the pages are properly ordered.

The operator views images on a signature printed from the printing press, compares it with the original images, and adjusts the ink fountains. He uses the keys to deliver, for example, more yellow ink to an outer strip of the image, or more magenta to a middle strip. If there are many pages in a single signature, the operator typically will view only two images or pages of a signature at a time by laying the image on an operator console.

This process can be long and complicated, especially when several images or pages are located on a single signature. The operator must identify the image to be corrected (for example by page number), and where the image to be corrected is located on the printing plate so that the corresponding keys are properly aligned with the printed image. Only then can the operator select the proper keys to adjust the ink fountains in the press. Especially if the images are of similar color or have similar designs, the process of identifying a signature, and its proper location above the keys on a control console, can be time consuming and frustrating for the operator.

SUMMARY OF THE PRESENT INVENTION

The present invention provides for automatic identification of the image to be corrected by comparing stored digital images of an initial sample with the actual signature images from the printing press. The pages can thus be quickly and easily identified. Moreover, by identifying the location of the signature image on the console surface, the system of the present invention can automatically choose the ink fountain set which is to be adjusted. The operator need not align the signature on the console.

The present invention therefore provides an apparatus for remote ink control fountain selection comprising a video camera for reading a signature image, an image digitizer, an image comparator for comparing the signature image to a sample image set and a memory device for storing the sample image set in digitized form.

A method for remote ink fountain selection is also provided comprising the steps of digitizing sample images and providing each said sample image with an identification; digitizing a printed signature image from a printing press which corresponds to at least one of the sample images; comparing the digitized printed signature image to the digitized sample images; and outputting the identification of the digitized sample image upon a match with the digitized signature image.

The digitized sample image and the digitized signature image of this method may be only part of the actual image which is reproduced by the printing press, for example the upper right comer of the actual image.

The apparatus and method permit the image on the signature to be quickly and easily identified, so that it can be compared with the sample image, thus reducing operator error and set-up time.

Moreover, the image comparator can be connected to a fountain control box to automatically set the fountains to be adjusted based on the page number or other identification of the signature image on a console surface. This eliminates the need for the operator to properly align the signature above the keys.

BRIEF DESCRIPTION OF THE DRAWINGS

The present invention will be described with reference to the following figures.

DETAILED DESCRIPTION

Figure 1:
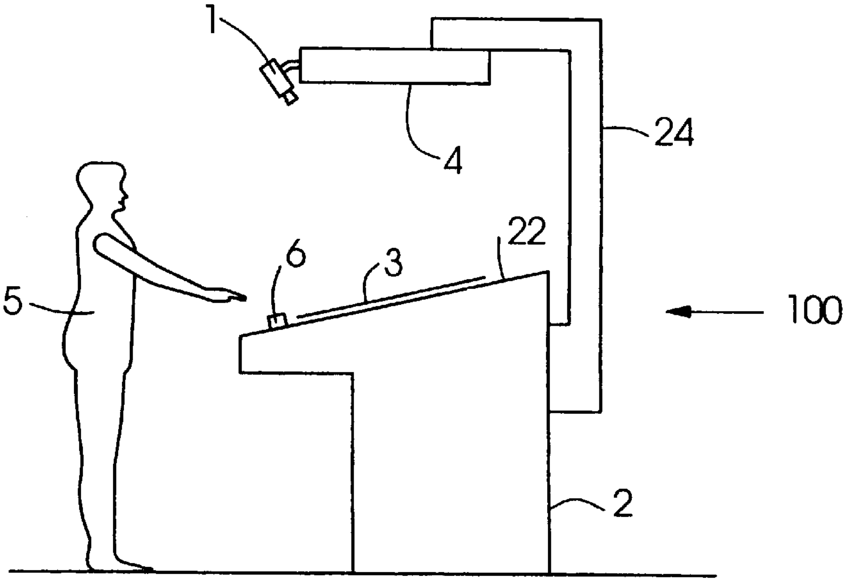
FIG. 1 shows an operator station of a printing press.

FIG. 1 shows an operator station 100 having a video camera 1 above an operator console 2. The operator console has a console surface 22 on which an operator 5 can place both an original sample 3 and a signature already printed from the printing press. A light source 4 is attached to the console 2 by a support 24. Keys 6 are located at the bottom of the console surface 22, and are used for adjusting individual ink fountains in the printing press. The operator 5 manually adjusts the keys 6.

Figure 2:
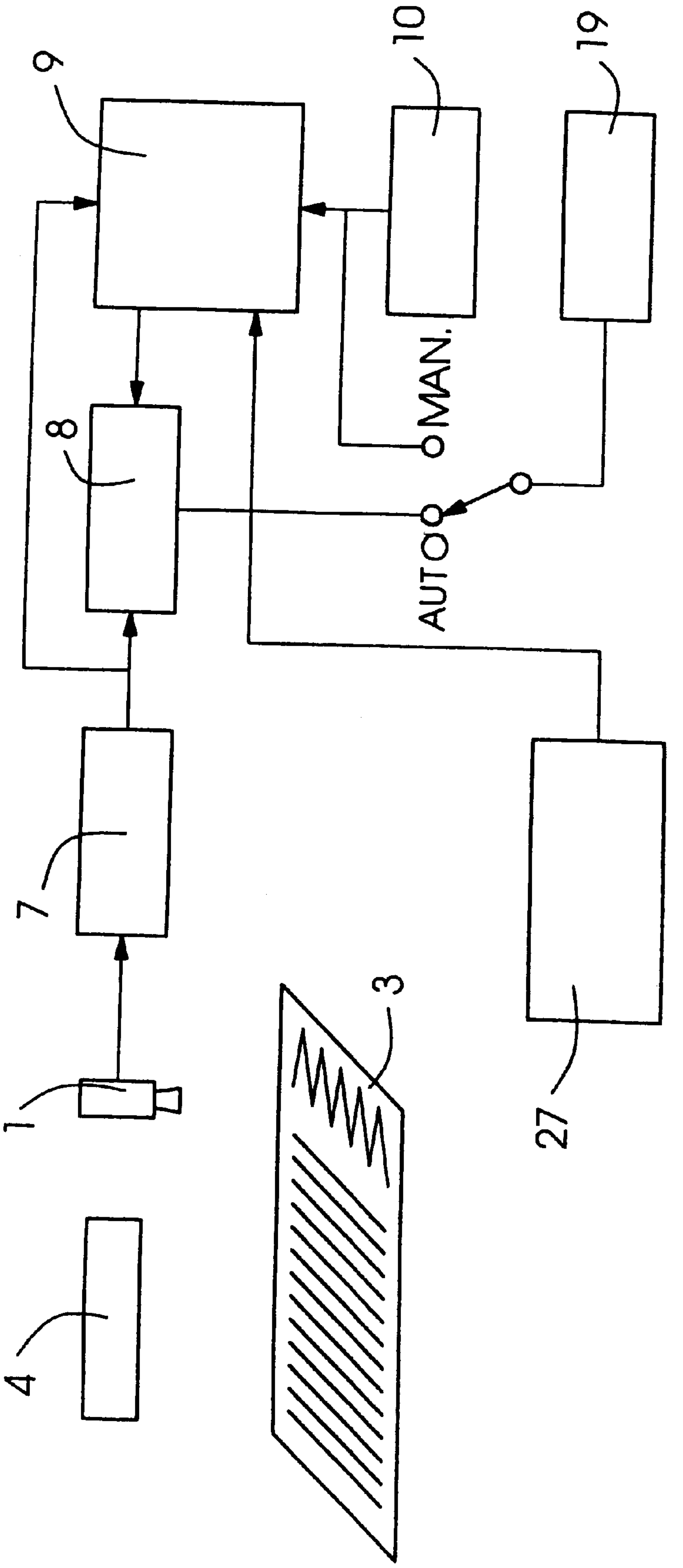
FIG. 2 shows schematically the system components of the present invention.

FIG. 2 shows the individual system components used to: (a) load initial sample images and designate their location and (b) after printing, identify the pages from the signature and select the corresponding ink fountain set.

First, an original sample 3 with images to be reproduced by the printing press is illuminated by a light source 4. The sample 3 may have several pages, for example the entire pages of a magazine to be printed. The pressman or operator turns the pages of the original sample 3, and the video camera 1 views the pages. An image digitizer 7 digitizes the images and stores the digitized images in an image memory 9. After each page turn, the operator identifies, by page select buttons 10 the identity or page number of the page being read. This page number or other identification is then stored along with the digitized image in the image memory 9.

Alternatively, it is also possible that the digitized images and their corresponding identification or page number come from a digital prepress or other external image source 27 and are fed directly into the image memory 9. An image memory of the prepress system or external image source also could constitute image memory 9.

The image memory 9 thus stores the digitized images of the original sample and the page number or identification of each image to be reproduced by the printing press.

After a signature or image is printed by the press, the operator examines the quality of the images for proper color. The operator opens the signature to the page the operator wishes to correct (which page might not have any page numbers at all) and places it on the console surface 22. The printed image is read by the camera 1 and digitized by the image digitizer 7, and compared in an image comparator 8 with the set of stored images in the memory 9. When a match is reached, the image comparator 8 outputs the page number or other identification of the printed image which is on the console surface.

The image comparator 8 can require various conditions to identify a match. For example, a certain percentage (e.g. 95 or 100%) of the digitized data of the printed image must match the digitized data of the original sample image. Alternatively, the image comparator 8 can also compare just a certain part of the image for example the right upper corner. The image digitizer 7 can also include compression software to compress the image data, and the compressed data can be compared by the image comparator as well.

The output page number or other identification can be provided directly to the operator, who can then select the proper set of keys to adjust. To do so, the operator aligns the signature on the console surface so that the keys right below the printed image align with the proper ink fountains in the press. For example, the image comparator outputs a page number 4. Page 4 of the printed material happens to correspond with the right quarter of the plate as it is placed on the upper print cylinder. The operator then aligns the signature at the right side of the console, selects the upper print cylinder and adjust the keys on the right side of the console to correct any improper color. The keys correspond to stripes of the image, and to ink fountains on the press.

Preferably, however. the proper selection of the key set corresponding to the signature image on the console surfaces a is also automated, as will be explained by reference to FIG. 3. The keys 6 are numbered, for example 1-64, and correspond initially through an electrical connection to the respective ink fountains along width of the print plate in the press. The video camera 4 and image comparator 8 (FIG. 2) identify the location of at least one edge 15 of a signature image 13 with respect to the The edge identification can be performed as follows: the console surface 22 may be provided a uniform color or specialized pattern. With the signature image 13 on the console surface 22, and covering only part of the console surface 22, the camera 4 reads the entire console surface 22 and image 15. The image digitizer 7 then digitizes this information and provides it to the image comparator 8, which includes software to identify which part of the digital information is the console surface (based on the uniform color or specialized patterned surface), and which part is the signature image. Since each data point of the information represents a certain location on the console surface 22, the image comparator 8 can identify where each edge of the image 13 is located on the console surface, and thus above which key set the image is located.

Alternatively, only a sideways strip of digitized information is provided to the image comparator 8. Because of the patterned surface or uniform color, this digital information follows a predefined pattern until the image side 15 is reached, at which time the image comparator 8 realizes that the image edge 15 has been located. The predefined pattern may be patterned in strips above the keys so that when the image edge has been reached the image comparator 8 knows exactly at which key 6 the edge 13 begins. (For example, the console surface 22 above key 1 may be a pattern of "A"s, the strip above key 2 a pattern of "B"s, etc . . . ).

Once at least the edge 15 has been located, the location of the signature image 13 is known, as is the key set 16 below the image 13. Since the page number or other identification of the signature image is also known, the image comparator 8 knows where on the printing plate the corresponding image is located, and thus the ink fountain set corresponding to that location on the printing plate. The keys are connected electrically to the ink fountains through a fountain control box, which identifies which key controls which fountain. The image comparator 8 thus sends signals to the fountain control box 19 (FIG. 2) to align the key set 16 to correspond with the proper ink fountain set. Without moving the signature on the console surface 22 the operator may then immediately adjust the keys below the image 13 to correct the color.

Figure 3:
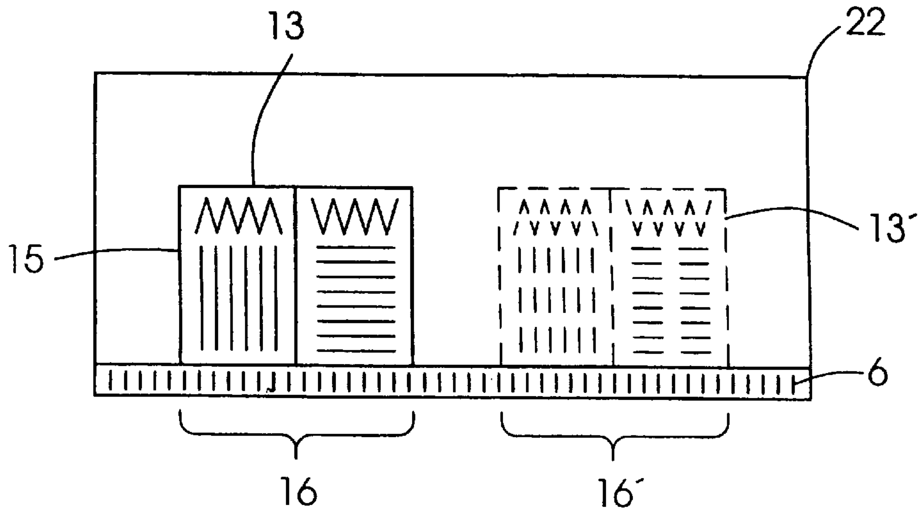
FIG. 3 shows the console surface with a same signature in two different places on the console surface.

As can be seen in FIG. 3, and merely for purposes of illustration, assume that the image 13 was placed in the exact proper place and the key set 16 corresponded perfectly to the desired ink fountain set for that page. Had the operator originally placed the signature in a different location as indicated by image 13', without the above method and device the operator would have to slide the image 13' to the left. However, with the present invention, the image comparator 8 identifies the edge 15' and key set 16', and sends instructions to the fountain control box 19 to align the proper fountains with the key set 16'. Thus the need for the operator to manually position the signature image on the console surface 22 can be eliminated.

What is claimed is:

1. A method for aiding remote ink fountain selection comprising the steps of:

digitizing sample images and providing each said sample image with an identification:

digitizing a printed signature image from a printing press which corresponds to at least one of the sample images:

comparing, the digitized printed signature image to the digitized sample images; and outputting the identification of the digitized sample image upon a match with the digitized signature image.

2. The method as recited in claim 1 wherein the sample images are at least a part of actual images to be reproduced by the printing press.

3. The method as recited in claim 1 wherein the identification is a page number.

4. The method as recited in claim 1 further comprising the step of sending a control instruction to a fountain control box based on the identification.

5. The method as recited in claim 1 further comprising the step of determining a location of the printed signature image on a console surface.

6. The method as recited in claim 5 further comprising the step of sending control instructions to a fountain control box based on the location.

* * * * *